Feb. 16, 1932.   J. H. SMITH   1,845,546
CONDENSER
Filed Dec. 5, 1930

INVENTOR
John H. Smith
BY A. B. Peavis
ATTORNEY

Patented Feb. 16, 1932

1,845,546

UNITED STATES PATENT OFFICE

JOHN H. SMITH, OF LANSDOWNE, PENNSYLVANIA, ASSIGNOR TO WESTINGHOUSE ELECTRIC & MANUFACTURING COMPANY, A CORPORATION OF PENNSYLVANIA

CONDENSER

Application filed December 5, 1930. Serial No. 500,362.

My invention relates to apparatus for condensing gaseous media and particularly to apparatus of the surface type intended primarily for condensing steam and it has for an object to provide apparatus of the character designated which shall be so constructed and arranged as to effectively utilize the entire cooling surface of the apparatus in order that it may operate at a very high heat transfer rate.

It has heretofore been proposed, as disclosed and claimed in United States Patent No. 1,748,676, issued February 25. 1930, for condenser and assigned to the Westinghouse Electric and Manufacturing Company, to locate, in a single-pass condenser, both the inlet and outlet circulating water connections in a common water box located at one end of the condenser. In such a condenser, there is provided, interiorly of the condenser shell structure, a longitudinally-extending pipe or trunk conduit of substantial flow area for connecting the remote end of the tube nest to one of the water connections provided in the water box. Such a condenser is especially applicable to power plants wherein the intake and discharge tunnels for supplying cooling water to and discharging cooling water from the condenser are located at a common end of the condenser shell. The latter condition prevails in all power plants where the condenser is installed in a vertical position and it also prevails in some power plants where the condenser is installed in a horizontal position.

More particularly, therefore, my invention has for an object to provide a condenser of the foregoing character which shall be so constructed and arranged as to utilize, to the fullest possible extent, the heat absorbing capacity afforded by the relatively large circulating water trunk conduit extending through the shell structure, and at the same time, to provide an arrangement of the tube nest in relation to the trunk conduit which will have a minimum pressure drop between the steam inlet side of the tube nest and the point of air removal.

Still more particularly, my invention has for an object to provide a condenser of the foregoing character wherein the relatively large circulating water trunk conduit is disposed in spaced relation to the walls of the condenser shell and wherein the tube nest is disposed about said trunk conduit and arranged to provide a condensing portion comprising a substantially U-shaped band of tubes embracing the trunk conduit on the three sides nearest the steam inlet, and a cooling portion adjacent the conduit on the remaining side remote from the steam inlet, whereby the periphery of the tube nest has a large portion thereof exposed to the exhaust steam entering the shell structure and a cooling portion adjacent the point of air removal.

My invention has for a still further object to provide a condenser of the foregoing character wherein the relatively large circulating water trunk conduit extending through the shell structure is located in the interior of the tube nest so as to permit a maximum flow of the exhaust steam into the condensing portion of the tube nest, and at the same time, provide a cooling area supplementing that portion of the tube nest which is arranged to cool the air prior to removal from the condenser.

My invention has for still another object to provide a form of tube nest disposed about the relatively large circulating water trunk conduit and arranged to embody a band of tubes exposed to the gaseous media inlet and through which the gaseous media travels in a transverse direction and also arranged to embody an interior portion in which the gaseous media travels in a longitudinal direction toward the point of air removal and which serves to cool the air and non-condensable gaseous media prior to its being withdrawn from the shell structure.

My invention has for still another object to provide a form of tube nest having a minimum resistance to the flow of steam or gaseous media therethrough or, in other words, a minimum pressure drop between the condenser exhaust steam inlet and the point of air removal, whereby a high degree of vacuum is maintained at the exhaust steam inlet of the condenser.

My invention has for a still further object to provide a form of condenser wherein the air and non-condensable gaseous media shall be removed at a minimum temperature and the condensate at the maximum temperature, and I, therefore, propose to remove the air from the longitudinal portion of the tube nest and from the cold or cooling water entrant end thereof and to remove the condensate from a portion of the shell structure disposed adjacent the warm or cooling water exit end of the tube nest and on the side thereof adjacent the exhaust steam or gaseous media inlet.

These and other objects are effected by my invention, as will be apparent from the following description and claims, taken in connection with the accompanying drawings, forming a part of this application, in which:

Figure 1:
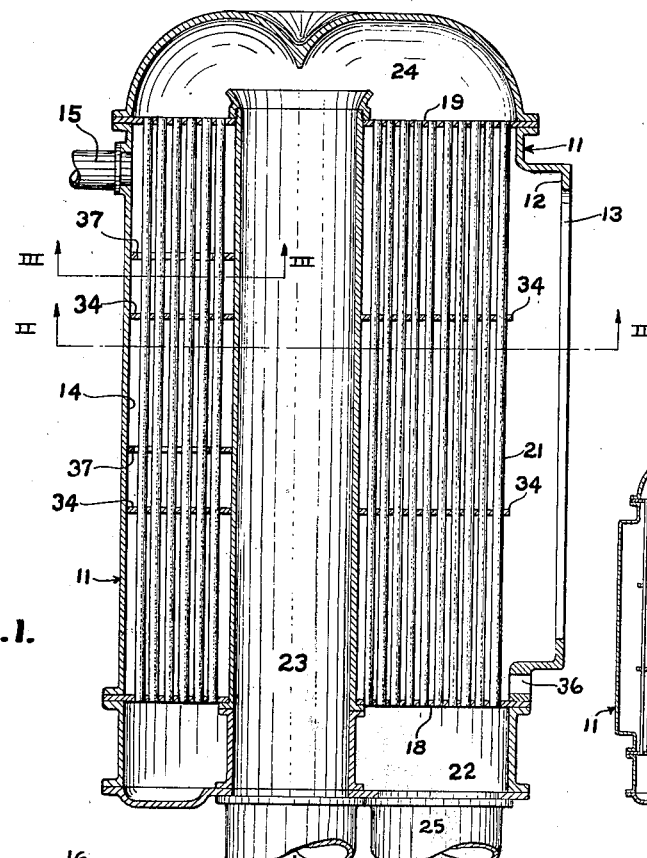
Fig. 1 is a view, in sectional elevation, taken along the line I—I of Fig. 2, of a condenser arranged in accordance with my invention and disposed in an upright position.
Figure 2:
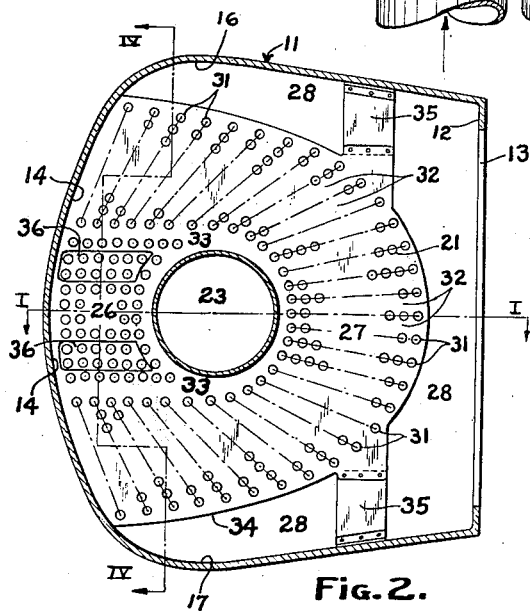
Fig. 2 is a view, in cross-section, taken along the line II—II of Fig. 1, showing the arrangement of the tube nest about the trunk conduit.

Referring now to Figs. 1 and 2 of the drawings, I show a condenser embodying a shell structure 11 having a front wall 12 provided with an inlet 13 for the steam or gaseous media to be condensed, a back wall 14 provided with an outlet 15 for the removal of air and non-condensable gaseous media and connecting side walls 16 and 17 joined to the front and back walls by substantial radii of curvature so as to form a shell structure of maximum rigidity. While, in the specification and claims, I term the wall structures "front", "back" and "side" walls, it is to be distinctly understood that these terms are employed merely in a relative sense and that they apply equally well whether the condenser be finally installed in a vertical position, that is, the position illustrated, or in a horizontal or any other position.

Tubes sheets 18 and 19 are disposed at each end of the shell structure and a tube nest 21 extends therebetween. Provided adjacent to the tube sheet 18 at the lower end of the shell structure is a water box 22 communicating with the lower end of the tube nest 21 for receiving cooling water from the tube nest. Cooling water is supplied to the tube nest by a trunk conduit 23 which extends longitudinally through the lower water box 22 as well as through the shell structure and terminates, beyond the upper tube sheet 19, in the interior of an upper return water box 24. Cooling water discharged from the tube nest is withdrawn from the lower water box 22 through a suitable outlet 25.

As shown, particularly in Fig. 2, the trunk conduit 23 is preferably disposed in spaced relation to the walls of the shell structure. The tube nest is divided into a longitudinal flow portion 26 disposed between the trunk conduit 23 and the back wall 14, which portion is utilized to cool the air prior to its removal, and a transverse flow portion 27 embracing the trunk conduit and serving primarily to condense the steam. The transverse flow portion 27 is preferably arranged in the form of a band or belt of tubes of substantially U-shape in transverse section and of substantially uniform width and is arranged to extend from a portion of the back wall 14 at one side of the longitudinal flow portion 26, around trunk conduit 23 and back to a portion of the back wall 14 on the other side of the longitudinal flow portion. In other words, the U-shaped band of tubes surrounds the trunk conduit 23 and the longitudinal flow portion 26. Its terminal tubes are disposed adjacent to the back wall 14 so that no steam can enter the cooling portion without having traversed the band of condensing tubes and becoming largely condensed.

The outer periphery of the band of tubes 27 is preferably spaced from the side walls 16 and 17 and front wall 12 of the shell structure so as to provide an intervening steam delivery space 28. By means of the foregoing arrangement, a relatively large portion of the exterior surface of the tube nest 21 is directly exposed to the exhaust steam admitted through the inlet 13, while at the same time, the inner periphery of the tube nest band 27 is adjacent to the relatively large circulating water trunk conduit 23 and the part of the tube nest 26 comprising the longitudinal flow portion.

In order to minimize the pressure drop of the gaseous media through the condenser, I prefer to arrange the band of tubes 27, comprising the transverse flow portion of the tube nest, to embody row of tubes 31 of uniform length which are arranged to extend along lines projecting outwardly from the trunk conduit 23 and the longitudinal flow portion 26. In addition, I provide equal transverse spacing between adjacent rows at the steam inlet and between adjacent rows at the steam outlet side of the band. In other words, the pitch or transverse spacing of the tubes at the outer periphery or inlet side of the band is uniform from row to row, as is the pitch or transverse spacing at the inner periphery or outlet side of the band. However, the pitch at the inner periphery is, preferably, less than the pitch at the outer periphery.

It will be noted that, with the foregoing arrangement, steam lanes or passages 32 of equal lengths are provided between the several adjacent rows of tubes 31 and that the lanes have flow-areas which decrease toward the outlet end thereof. By utilizing a smaller pitch at the outlet side of the tube band, the flow area of each of the lanes 32 is made to accommodate itself to the decreasing volume of the steam due to condensation as it flows through the tube nest. By means of the foregoing arrangement, the steam entering the tube nest encounters uniform resistance in all portions of the nest and, hence, will distribute itself uniformly in a transverse direction, over the entire tube band.

Also, I prefer to space the interior or exit side of the band of tubes 27 from the trunk conduit 23 and from the longitudinal flow portion of the tube nest so as to provide an intervening gaseous media flow space 33. Such a flow space permits the gaseous media emerging from the outlet of the transverse band of tubes 27 to readily circulate about the relatively cool trunk conduit 22 and distribute itself among the cooling tubes of the longitudinal flow portion 26.

Suitable intermediate tube-supporting sheets 34. are provided for supporting the tube nest intermediate of the end tube sheets. These divide the tube nest longitudinally into a plurality of sections. The outer boundary of the intermediate tube sheets 34 preferably conforms with the outer boundary of the tube nest in order that the steam delivery space may freely distribute the steam to be condensed to the entire length of the tube nest. The intermediate tube sheets are secured at one side to the back wall 14 of the shell structure and at the other side by suitable brackets 35 attached to the side walls 16 and 17 of the shell.

Figure 4:
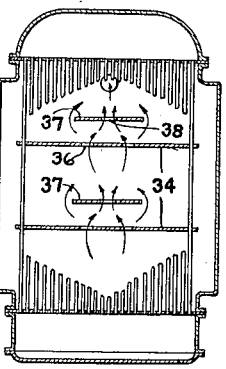
Figure 3:
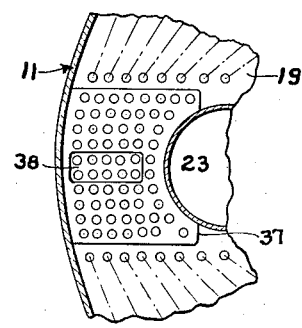
Fig. 3 is a fragmentary detail view, taken along the line III—III of Fig. 1, showing the arrangement of an auxiliary tube sheet in the cooling portion of the tube nest; and, Fig. 4 is a diagrammatic view taken along the line IV—IV of Fig. 2, showing the path of the gaseous media flowing longitudinally through the cooling portion of the tube nest.

In order to afford longitudinal circulation of gaseous media through the longitudinal flow or cooling portion of the tube nest, the intermediate tube sheets 34 have portions cut away in the part thereof traversed by the cooling tubes, as shown in Fig. 2, such cut away portions being arranged to form openings 36 of substantial flow area. However, as the cooling tubes passing through the openings must be supported intermediate of the end tube sheets, I provide, for supporting these tubes, supplementary intermediate tube sheets 37, such as illustrated in Fig. 3, which are displaced, longitudinally, from their associated main intermediate tube sheets 34. The supplementary tube sheets 37 project from the back wall of the shell structure through the cooling portion of the tube nest and extend, preferably, beyond the margin of the openings 36 in the main intermediate tube sheets. The supplementary intermediate tube sheets are each provided with an opening 38, disposed in staggered relation with the openings 36 in the main intermediate tube sheets so that the two sheets in cooperation effect, as indicated by the arrows in Fig. 4, a somewhat tortuous path of travel for the gaseous media flowing longitudinally through the cooling portion of the tube nest.

The air offtake conduit 15 extends through the back wall of the shell structure and connects with the longitudinal flow or cooling portion near the cooling water entrant end of the tube nest. By means of this arrangement, the air and gaseous media from the several sections of the tube nest is drawn into the longitudinal flow or cooling portion and thence circulates longitudinally through the openings 36 and 38 in the intermediate tube sheets towards the cold end of the tube nest where it is removed from the condenser through the offtake 15. During this longitudinal circulation, the condensable components of the gaseous media are condensed while the non-condensable components are effectively cooled.

Condensate is removed from the condenser shell through an outlet 36 which is located in the shell structure 11 just above the lower end tube sheet 18, preferably, on the side of the shell structure adjacent the exhaust steam inlet 13.

From the foregoing description, the operation of my invention will be apparent. Cooling water for operating the condenser enters the trunk conduit 23 and is conveyed through the outlet water box 22 at the lower end of the tube nest and through the shell structure to the return water box 24 at the upper end of the tube nest, from which it is distributed to the tubes, the upper end of the tube nest 21 constituting the entrant end of the nest and the lower end the exit end. The cooling water is finally removed from the condenser through the outlet 25 leading from the outlet water box. It will, therefore, be apparent that such an arrangement provides a condenser having an odd number of passes of cooling water through the tube nest and wherein both the cooling water inlet and outlet connections are located in a common water box at one end of the condenser. However, it should be noted, in this connection, that the direction of flow of the cooling water through the trunk conduit and the tube nest of a condenser arranged in accordance with my invention is not limited to the specific example described above.

Owing to the very large flow area of the trunk conduit 23, the water therein assumes only a slight increase in temperature in passing through the shell structure and, hence, there is very little temperature difference between the inlet end of the conduit and its outlet end. However, when the cooling water in the trunk conduit enters the numerous tubes of the tube nest, it is divided into many relatively small streams and, consequently, absorbs heat quite readily. As a result, the water in the tube nest assumes materially increasing temperatures as it circulates from the upper entrant end of the tube nest to the exit end below.

The tube nest arrangement is such that steam or gaseous media from the inlet 13 enters the outer periphery of the substantially U-shaped band of tubes 27, constituting the transverse flow portion of the tube nest, flows inwardly through the passages 32 between the respective rows of tubes 31, circulates over the tubes and becomes largely condensed as it proceeds toward the trunk conduit 23 and the longitudinal flow portion 26 of the tube nest. It will be noted, that the entire outer periphery of the band of tubes 27 is exposed to the steam delivery space 28 communicating with the condenser inlet 13 and that, because of the uniformity of width of the steam lanes throughout the outer band of tubes, all portions transversely of the band receive substantially equal amounts of steam and that also because of the uniformity of length of such lanes and of the rows of tubes, the resistance to the flow of the steam or gaseous media across the band due to the presence of tubes is substantially uniform throughout. The result is that the steam passes through the tube nest, with a minimum resistance and, consequently, a high vacuum at the exhaust steam inlet of the condenser is maintained.

However, because of the relatively lower temperature prevailing in the upper or entrant end of the tube nest, a higher heat head prevails in this end than at the lower or exit end and there is a natural tendency for the steam in the delivery space 28 to move longitudinally toward the cold or entrant end of the tube nest. Consequently, more steam is delivered to the cold end of longitudinal portions or sections of the tube nest and less to the warm end.

After traversing the band of tubes 27, that portion of the gaseous media which remains uncondensed enters the intervening space 33 and circulates about the trunk conduit 23 and flows into the longitudinal flow or cooling portion 26 of the tube nest. After entering the cooling portion, the gaseous media flows longitudinally of the cooling portion 26, passing through the openings 36 in the main intermediate tube sheets 34 and through the openings 38 in the auxiliary intermediate tube sheets 37 as well as partly passing around the sides of the auxiliary sheets 37, as shown by the arrows in Fig. 4. The air is finally removed from the air offtake 15. During this longitudinal circulation, the remaining quantity of steam is condensed while the non-condensable gaseous media is cooled and is ultimately removed from the coldest portion of the tube nest through the offtake 15. Hence, the non-condensable gases are removed from the condenser shell at minimum temperature.

In order that the condensate may leave the shell structure at a maximum temperature, the water is circulated through the tube nest 21 so that the outlet water box containing the relatively warm water is located at the lower end of the condenser, thus enabling the relatively warm tube sheet 18 to serve as the tube sheet over which the condensate passes in flowing toward the condensate outlet 36. The condensate outlet 36 is located in the front wall 12 of the condenser so that the condensate may be swept by the relatively warm exhaust steam entering the condenser through the inlet 13.

In circulating longitudinally through the longitudinal flow section 26 of the tube nest, the air and non-condensable gaseous media are brought into intimate contact not only with the tubes in the longitudinal flow section 26, but with some of the adjacent tubes in the transverse section 27 and with the adjacent surface of the trunk conduit 23. The idea of circulating gaseous media longitudinally through the shell structure in contact with the trunk conduit, such as 23, has been previously disclosed and claimed in my co-pending application, Serial No. 439,388, filed March 27, 1930, entitled Condenser and assigned to the Westinghouse Electric and Manufacturing Company. In addition, the idea of circulating gaseous media transversely through one portion of the tube nest and longitudinally through another portion of the tube nest was disclosed and claimed in my co-pending applications, Serial No. 412,800, filed December 9, 1929, and Serial No. 459,803, filed June 7, 1930, both assigned to the Westinghouse Electric and Manufacturing Company.

The location of the trunk conduit is such that the gaseous media which is passed through the band of tubes constituting the transverse flow portion, circulates about the trunk conduit and flows into the portion of the tube nest embraced between the trunk conduit and the back wall. In view of the fact that the trunk conduit must be of such ample portions as to convey adequate cooling water for the tube nest, it is evident, that by means of the arrangement disclosed, the trunk conduit serves to materially supplement the longitudinal flow portion of the tube nest in its cooling action on the gaseous media prior to removal from the condenser. In this connection, it is noted, that, while in the present embodiment, I show a single trunk conduit for conveying water for all of the tube nest, it will be obvious that it is within the purview of my invention to utilize more than one trunk conduit, in which case the number of such trunk conduits would be only a small percentage of the total number of cooling tubes and, consequently, the flow area of each of such trunk conduits would be equivalent to the total flow area of a group of condensing tubes.

From the foregoing, it will be apparent that I provide a condenser having a form of tube nest which offers a minimum resistance to the flow of steam therethrough, resulting in minimum loss of vacuum between the point of air removal and the exhaust inlet, and also a form of tube nest arrangement which will have substantially uniform transverse steam distribution.

In addition, it will be apparent that I provide a form of condenser which is of the single or odd-pass type, wherein both the inlet and outlet cooling water connections are located in a common end of the condenser. It will be further apparent that I provide a condenser of the foregoing character wherein the trunk conduit for conveying cooling water through the shell structure of the condenser is utilized to the fullest extent to supplement the cooling action of the tube nest.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a condenser, the combination of a shell structure embodying front, back and side walls, inlet means for gaseous media to be condensed provided in the front wall, a tube nest extending longitudinally through the shell structure, and a trunk conduit extending longitudinally through the shell structure for conveying cooling water to one end of the tube nest, said tube nest being arranged to form, in transverse section, a band of tubes substantially uniform in width and spaced from the front wall and the side walls of the shell structure to form a steam delivery space about the periphery thereof and in communication with the inlet means, said band of tubes being disposed to partly surround the trunk conduit and arranged to embody substantially parallel portions having their terminal tubes disposed adjacent to the back wall.

2. In a condenser, the combination of a shell structure having an inlet for gaseous media to be condensed and embodying side walls and a back wall, a tube nest extending longitudinally through the shell structure, and a trunk conduit extending longitudinally through the shell structure for conveying cooling water to one end of the tube nest, said tube nest comprising, in transverse section, a band of tubes having an arcuate-shaped portion spaced from the side walls and exposed at its outer periphery to the gaseous media from the inlet and having linear portions extending from the extremities of the arcuate portion to the back wall, the arcuate-shaped portion of the band of tubes being disposed to partially embrace the trunk conduit.

3. In a condenser, the combination of a shell having an inlet for gaseous media to be condensed and embodying side and back wall structures, a trunk conduit for conveying cooling water extending longitudinally through the shell structure and spaced from the inlet and from the side and back wall structures, a tube nest extending longitudinally through the shell structure and embodying a substantially U-shaped band of tubes occupying a substantial portion of the transverse area of the condenser including the transverse area intervening between the trunk conduit and the gaseous media inlet and between the trunk conduit and the side wall structure, the tubes of said band being arranged to form rows of equal length, and means for connecting one end of the trunk conduit to one end of the tube nest.

4. In a condenser, the combination of a shell structure having an inlet for gaseous media to be condensed and embodying longitudinally-extending back and side walls, a tube nest extending longitudinally through the shell structure, and a trunk conduit for conveying cooling water to one end of the tube nest extending longitudinally through the shell structure and spaced from the walls thereof, said tube nest embodying, in transverse section, a substantially U-shaped band of tubes disposed to embrace the trunk conduit, the tubes of said band being arranged in rows radiating outwardly substantially from a point located eccentric of the axis of the trunk conduit in the direction of the back wall.

5. In a condenser, the combination of a shell structure having an inlet for gaseous media to be condensed, a tube nest extending longitudinally through the shell structure, a trunk conduit for conveying cooling water extending longitudinally through the shell structure, and spaced from the walls thereof, and means for connecting one end of the trunk conduit with one end of the tube nest, said tube nest embodying, in transverse section, a substantially U-shaped band of tubes exposed at its outer side to the gaseous media from the inlet and located so as to embrace the trunk conduit at the inner side, said band of tubes being arranged in transverse rows of substantially equal length and having a uniform pitch between the rows, the pitch at the outer side of the band being greater than at the inner side.

6. In a condenser, the combination of a shell structure embodying front, back and side walls, inlet means for gaseous media to be condensed provided in the front wall, a tube nest extending longitudinally through the shell structure and spaced from the front and side walls thereof so as to provide, between the tube nest and the shell structure, a steam delivery spaced, and a trunk conduit for conveying cooling water for the tubes disposed interiorly of the tube nest and extending longitudinally through the shell structure, said tube nest embodying, in transverse section, a group of cooling tubes disposed between the trunk conduit and the back wall and a substantially U-shaped band of condensing tubes exposed about its outer periphery to the steam in the delivery space, said band of condensing tubes being arranged to embrace, at its inner periphery, the trunk conduit and the group of cooling tubes and said band of condensing tubes comprising transverse rows arranged to provide therebetween substantially uniform flow lanes converging from the outer periphery of the band toward the inner periphery and extending in a general direction toward the group of cooling tubes.

7. In a condenser, the combination of a shell structure embodying walls, a tube nest extending longitudinally through the shell structure and comprising a condensing portion and a cooling portion, and a trunk conduit for conveying cooling water to one end of the tube nest extending longitudinally through the shell structure and spaced from the walls, the condensing portion of said tube nest being arranged to form, in transverse section, a U-shaped band of substantially uniform width having its leg portions extending adjacent to the walls of the shell structure and said U-shaped portion being disposed to embrace the trunk conduit and the cooling portion of the tube nest.

8. In a condenser, the combination of a shell structure having inlet means for gaseous media to be condensed, a tube nest extending longitudinally through the shell structure and exposed to the gaseous media from the inlet, a trunk conduit extending longitudinally through the shell structure for conveying cooling water for the tube nest, said tube nest embodying, in transverse section, a group of tubes disposed on one side of the trunk conduit for the circulation of gaseous media in a longitudinal direction and also embodying a band of tubes for the circulation of gaseous media in a transverse direction, said band of tubes partially surrounding both the trunk conduit and the longitudinal flow group of tubes, means connecting one end of the trunk conduit to the adjacent end of the tube nest for conveying cooling water for the tube nest, and means connecting with the longitudinal flow portion of the tube nest for the removal of noncondensable gaseous media from the shell structure.

9. In a condenser, the combination of a shell structure having an inlet for gaseous media to be condensed, a tube nest extending longitudinally through the shell structure, said tube nest embodying, in transverse section, a substantially U-shaped band of tubes exposed at its outer side to the gaseous media from the inlet, and means providing for the removal of non-condensable gaseous media from the inner side of the band of tubes, said band of tubes embodying transverse rows of tubes of substantially equal length and having a uniform pitch between the rows, the pitch at the outer side of the band being greater than at the inner side.

10. In a condenser, the combination of a shell structure having an inlet for gaseous media to be condensed and embodying side and back walls, a tube nest extending longitudinally through the shell structure and embodying a bank of cooling tubes and a belt of condensing tubes, the belt of condensing tubes being disposed transversely of the shell structure and arranged to embrace the bank of cooling tubes between one of its boundaries and the back wall of the shell structure, said belt of condensing tubes having its other boundary spaced from the gaseous media inlet and the side walls of the shell structure so as to provide an intervening steam delivery space, the tubes of said belt being arranged in transverse rows of substantially equal length and having formed therebetween steam lanes of equal flow-areas converging toward the bank of cooling tubes, and means for removing non-condensable gaseous media from the bank of cooling tubes.

11. In a condenser, the combination of a shell having an inlet for gaseous media to be condensed and embodying side and back wall structure, a trunk conduit for cooling water extending longitudinally through the condenser shell and spaced from the inlet and from the side and back wall structures, a tube nest extending longitudinally through the condenser shell comprising a band of condensing tubes occupying a substantial portion of the area thereof including the transverse area intervening between the trunk conduit and the gaseous media inlet as well as a portion of the transverse area intervening between the trunk conduit and the side wall structures, said tube nest also embodying a group of cooling tubes occupying a substantial portion of the transverse area intervening between the trunk conduit and the back wall structure, means for connecting one end of the trunk conduit to one end of the tube nest and providing for circulation of cooling water through the latter in a single, longitudinal direction, means connecting with the interior of the shell structure at the cooling water entrant end of the longitudinal flow portion for the removal of uncondensed gaseous media from the tube nest, means providing for the transverse flow of gaseous media through the band of condensing tubes, and means providing for the longitudinal flow of gaseous media through the group of cooling tubes.

12. In a condenser, the combination of a shell structure having oppositely-disposed front and back walls and oppositely-disposed side walls, means for the admission of gaseous media provided in the front wall of the shell structure, a trunk conduit for conveying cooling water extending longitudinally through the shell structure and disposed in spaced relation with respect to the several walls, a tube nest extending longitudinally through the shell structure, said tube nest embodying, in transverse section, a bank of cooling tubes extending between the trunk conduit and the back wall of the shell structure and providing for the longitudinal circulation of gaseous media, said tube nest embodying also in transverse section a band of condensing tubes disposed to embrace the trunk conduit and the bank of cooling tubes between its inner boundary and the back wall and providing for transverse circulation of gaseous media, said band having its outer boundary spaced from the front and side walls of the shell structure so as to form an outer gaseous media delivery space and having its inner boundary spaced from the trunk conduit and the cooling tube bank so as to form an intermediate gaseous media delivery space, and means in communication with the bank of cooling tubes for the removal of non-condensable gaseous media from the shell structure.

13. In a condenser, the combination of a shell structure having oppositely-disposed front and back walls and oppositely-disposed side walls, means provided in the front wall for the admission of gaseous media to be condensed, a trunk conduit for conveying cooling water extending longitudinally through the shell structure, said tube nest embodying a bank of cooling tubes extending between the trunk conduit and the back wall structure and arranged to provide for longitudinal flow of gaseous media therethrough, said tube nest embodying also a substantially U-shaped band of condensing tubes arranged to embrace, at its inner boundary, the trunk conduit and the bank of cooling tubes and arranged to provide for transverse flow of gaseous media therethrough, said tube band comprising in transverse section a series of rows of tubes radiating outwardly from the bank of cooling tubes and having formed therebetween substantially uniform flow lanes converging from the outer boundary of the band toward the bank of cooling tubes and said band having its outer boundary spaced from the front and side walls of the shell structure so as to form an intervening gaseous media delivery space in communication with the outer end of the gaseous media flow lanes, said band also having its inner boundary spaced from the trunk conduit and the bank of cooling tubes so as to form an intermediate gaseous media delivery space in communication with the gaseous media flow lanes at their inner ends, means for connecting one end of the trunk conduit to the adjacent end of the tube nest and providing for circulation of cooling water through the latter in a single, longitudinal direction, and means communicating with the bank of cooling tubes near the cooling water entrant end thereof for the removal of non-condensable gaseous media from the shell structure.

14. In a condenser, the combination of a shell having an inlet for gaseous media to be condensed and embodying side and back wall structures, a trunk conduit for cooling water extending longitudinally through the condenser shell and spaced from the side and back wall structures, a tube nest extending longitudinally through the condenser shell and comprising a band of tubes occupying a substantial portion of the area thereof including the transverse area intervening between the trunk conduit and the gaseous media inlet, as well as a portion of the transverse area intervening between the trunk conduit and the side wall structure, said tube nest embodying also a bank of tubes occupying a substantial portion of the transverse area intervening between the trunk conduit and the back wall structure, means for connecting one end of the trunk conduit to one end of the tube nest and providing for circulation of cooling water through the latter in a single, longitudinal direction, tube sheets disposed at each end and intermediate the ends of the tube nest for supporting the latter, each of said intermediate tube support sheets embodying, in the portion thereof disposed between the trunk conduit and the back wall structure, an opening for affording longitudinal circulation of gaseous media through the tube nest, and means for the removal of uncondensed gaseous media from the shell structure adjacent the cooling water entrant end of the tube nest.

15. In a condenser, the combination of a shell having an inlet for gaseous media to be condensed and embodying side and back wall structures, a trunk conduit for cooling water extending longitudinally through the condenser shell and spaced from the inlet and from the side and back wall structure, a tube nest extending longitudinally through the condenser shell and embodying a band of tubes occupying a substantial portion of the area thereof including the transverse area intervening between the trunk conduit and the gaseous media inlet as well as a substantial portion of the area intervening between the trunk conduit and the side wall structure, said tube nest also embodying a bank of tubes occupying a substantial portion of the area intervening between the trunk conduit and the back wall structure, means for connecting one end of the trunk conduit to one end of the tube nest and providing for circulation of cooling water through the latter in a single, longitudinal direction, tube sheets disposed at each end and intermediate the ends of the tube nest for supporting the latter, said intermediate tube support sheets embodying, in the portion thereof disposed between the trunk conduit and the back wall structure, openings for affording longitudinal circulation of gaseous media, supplementary intermediate tube sheets spaced, longitudinally, from the main intermediate tube sheets for supporting the tubes of the tube nest passing through the openings in the main intermediate tube sheets, said supplementary intermediate tube sheets embodying openings for affording longitudinal flow of gaseous media, the openings in the latter being disposed transversely in staggered relation to the openings in the main intermediate tube sheets, and means providing for the removal of non-condensable gaseous media from the cooling water entrant end of the tube nest and through that portion thereof interposed between the trunk conduit and the back wall structure.

In testimony whereof, I have hereunto subscribed my name this 26th day of November, 1930.

JOHN H. SMITH.